Aug. 10, 1965 E. S. MOYER 3,199,299
MASTER CYLINDER PRIMARY CUP ANTI-EXTRUSION MECHANISM
Filed June 27, 1963
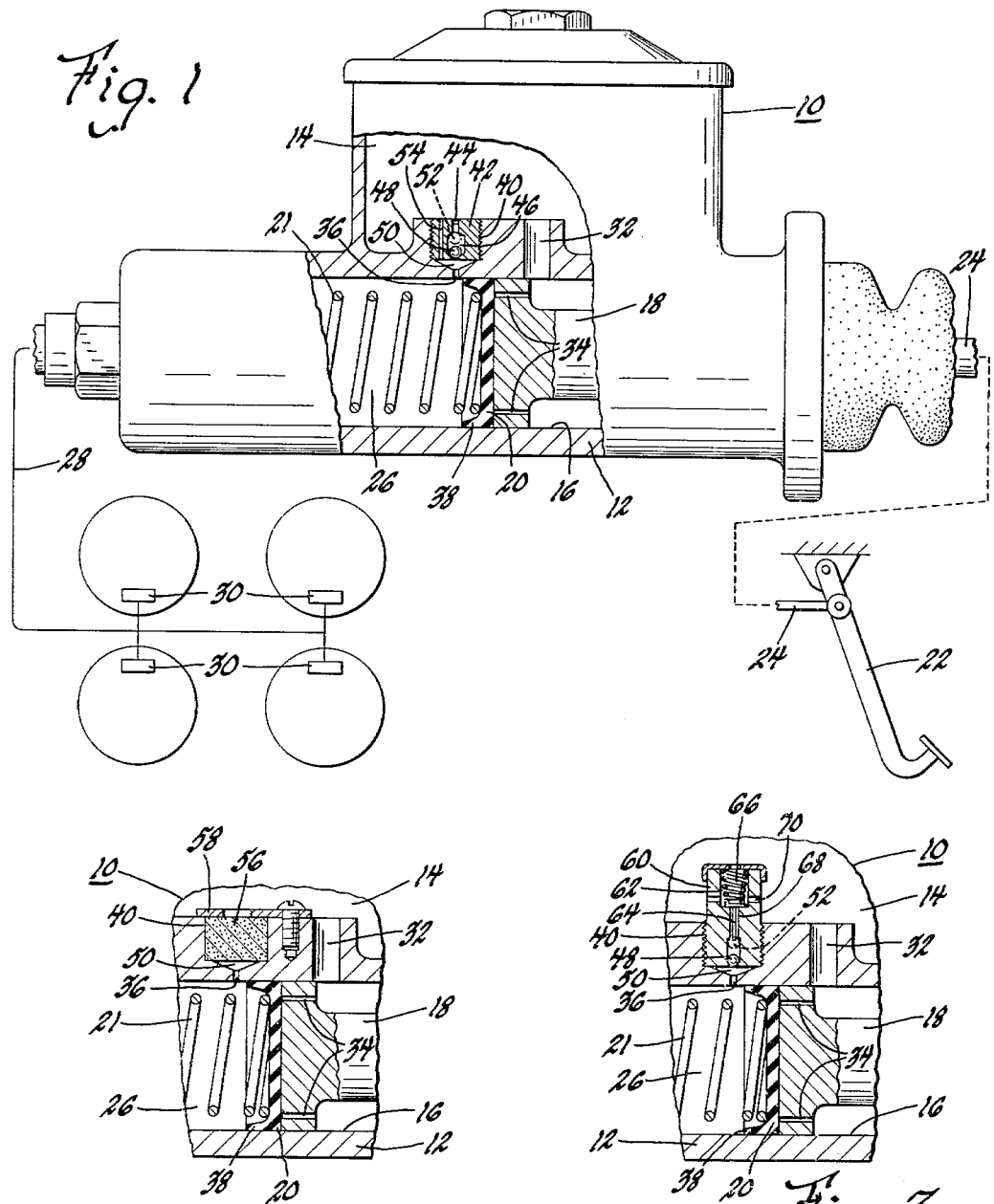
INVENTOR.
Elton S. Moyer
BY
O. D. McGrew
HIS ATTORNEY

3,199,299
MASTER CYLINDER PRIMARY CUP ANTI-EXTRUSION MECHANISM

Elton S. Moyer, Dayton, Ohio, assignor to General Motors Corporation, Detroit, Mich., a corporation of Delaware
Filed June 27, 1963, Ser. No. 291,092
9 Claims. (Cl. 60—54.6)

The invention relates to constructions wherein the primary cups of master cylinders of the type commonly employed in vehicle brake and clutch operation are prevented from extruding into the bypass ports upon initial fluid pressurization, and more particularly to constructions which prevent such extrusion by limiting the pressure differentials between the pressurizing chambers of the master cylinders and the bypass ports so that extrusion of the cups is effectively prevented.

It has long been a problem in the master cylinder art, and particularly with regard to master cylinders used in vehicle brake systems which must quickly generate high fluid pressures, to prevent or minimize damage to the primary cup caused by it being extruded into the bypass port connecting the pressurizing cylinder and the master cylinder reservoir. Various constructions have been proposed, some of which would remove the bypass port from the wall of the master cylinder bore so that it is not covered by the primary cup during a portion of operation of the piston and cup pressurizing action. While some systems of this type have been operable, they are more expensive due to complicated structural details and the requirement of additional complicated parts. It is now proposd to effectively prevent extrusion of the primary cup by limiting the pressure differential between the pressurizing chamber and the passage terminating at the bypass port to a pressure value which the structural resistance of the cup will resist so as not to be extruded into the port. The invention as disclosed and claimed herein may be embodied in a check valve mechanism sensitive to the pressure generated in the pressurizing chamber which will cause a pressure buildup at the bypass port adjacent the pressurizing chamber at a sufficient rate in relation to the pressurizing chamber buildup rate so as to limit the pressure differential across the bypass port to safe limits for operation of the primary cup without extrusion of any portion of the cup into the port. The valve mechanism may be formed as an assembly which can be inserted in the passage connecting the fluid reservoir to the bypass port. The bypass valve mechanism may be provided with a positive valve unseating arrangement which will effectively prevent the trapping of high pressure fluid, or may be provided with a suitable highly restrictive vent passage which assists in establishing the safe pressure differential. A somewhat different insert may be provided which is formed of a porous material which will pass fluid therethrough but is highly pressure restrictive so as to quickly and effectively establish the desired bypass port pressure within safe pressure differential limits, while permitting the necessary fluid bypass action when the piston and primary cup of the master cylinder are in the retracted position.

In the drawing:

FIGURE 1 shows a master cylinder with an insert for limiting the pressure differential across the bypass port by means of a check valve mechanism;

FIGURE 2 shows a section of the master cylinder wherein the pressure differential limiting means comprises an insert with a porous material as the restrictive means; and FIGURE 3 shows a section of the master cylinder using an insert with a modification of the check valve mechanism illustrated in FIGURE 1.

FIGURE 1 shows a master cylinder assembly 10 which includes a housing 12 formed to provide a fluid reservoir 14 and a bore 16. A pressurizing piston 18 and primary cup 20 are reciprocably mounted in bore 16 in the conventional manner, with the piston return spring 21 urging the piston and cup to the retracted position shown. Piston 18 may be actuated by the vehicle operator by movement of the brake pedal 22 which acts on the push rod 24 to move the piston 18. A pressurizing chamber 26 is defined by bore 16 and the cup 20 backed by the piston 18. The brake pressure conduit system 28 receives pressurized fluid from chamber 26 and conducts it to the brake wheel cylinders 30 to actuate the vehicle brakes.

A compensation port 32 formed in housing 12 connects the fluid reservoir 14 with the portion of the bore 16 behind the head of piston 18 so as to provide for the compensation of fluid which may be lost in the brake pressure system. This fluid is conducted to the pressurizing chamber 26 in the usual manner by means of piston passages 34 and the valving action of the cup 20. A bypass port 36 is formed in the wall of bore 16 so that it is connected with the pressurizing chamber 26 when the lip 38 of cup 20 is in the fully retracted cup-and-piston position shown. A passage 40 connects the reservoir 14 to the pressurizing chamber 26 and terminates at the bypass port 36.

In the embodiment of the invention shown in FIGURE 1 an insert 42 provides a valve housing and is fastened into passage 40 by any suitable means such as the threads formed in the passage 40 and on the insert 42. A port 44 formed in insert 42 connects reservoir 14 with a valve chamber 46 formed internally of the insert 42. A check valve 48, preferably a ball, is received in chamber 46 and occupies the valve lower position shown in full lines when the piston and cup mechanisms are retracted as shown. The lower end of chamber 46 may be suitably formed to prevent valve 48 from falling out of the chamber, while providing fluid connection between the chamber 50 formed by the lower end of passage 40 and the valve insert chamber 46. The valve 48 may occupy the valve upper position 52 when pressure is initially generated in chamber 26 so as to close off the port 44. This action will cause a buildup of fluid pressure in chamber 50 so that the pressure differential at the bypass port 36 is limited to a value sufficiently low to prevent the extrusion of cup 20 into the port 36 as the cup and piston are moved to pressurize fluid in chamber 26. A very small vent passage 54 may be provided in insert 42 in parallel flow relation to valve chamber 46 so as to prevent the trapping of high pressure fluid in chamber 50.

The modification illustrated in FIGURE 2 utilizes a porous plug insert 56 secured in passage 40. Plug 56 may be held in place by retainer 58. The characteristics of the porosity of plug 56 are such that the plug will permit fluid flow therethrough at low outlet pressures but will restrict pressure loss during such flow so that when a high pressure exists on one side of the plug a pressure buildup will occur on that side. Thus when the cup 20 and piston 18 are moved in a pressurizing direction, the pressure generated in chamber 26 is exerted through the bypass port 36 and into the passage chamber 50. The restrictive nature of the plug 56 obtained by tortuous path fluid flow therethrough causes a pressure buildup in chamber 50 so as to maintain a safe pressure differential across port 36 which will permit cup 20 to pass over the bypass port 36 without being extruded into the port by the pressure generated in chamber 26. The porous nature of plug 56 will prevent the trapping of high pressure in chamber 50 and will permit the necessary bypass action between the reservoir 14 and the pressurizing chamber 26.

The modification shown in FIGURE 3 is somewhat similar to that of FIGURE 1. However, the valve housing insert 60 is also provided with a chamber 62 containing a valve operator 64 and an operator spring 66. The valve operator 64 has a portion thereof extending through the port 68 joining the valve chamber 46 and the chamber 62 so that when the valve 48 is moved upwardly to close port 68, it compresses spring 66. Thus, when the pressure in the chamber 50 is reduced below a predetermined point, spring 66 acts on valve operator 64 to positively move the valve toward the lower position and reopen port 68. A suitable passage 70 is provided to connect chamber 62 with the reservoir chamber 14 so that bypassed fluid may enter the reservoir from the pressurizing chamber 26.

Mechanisms have been disclosed which effectively prevent the corrosive effects of pressure-caused extrusion of the master cylinder primary cup into the bypass port during initial pressurizing action of the master cylinder. This results in longer primary cup life and safer vehicle brake operation when the master cylinder is utilized in a vehicle brake system.

I claim:

1. In a master cylinder assembly having a fluid reservoir, a cylinder bore with a pressurizing piston movable therein to form therewith a pressurizing chamber, a rubber-like primary cup on one end of said piston for sealing and compensating said pressurizing chamber, a compensating port connecting said reservoir and said bore, a bypass port passage connecting said reservoir and said bore at said pressurizing chamber adjacent said primary cup when said piston is retracted and terminating in a bypass port at said bore adapted to be closed by said primary cup upon pressurizing movement of said piston, and means in said passage sensitive to the rate of generation of fluid pressure generated in said pressurizing chamber at the beginning of pressurizing movement of said piston to establish a pressure at said bypass port generated at a corresponding rate of generation to limit the pressure differential at said bypass port to prevent extrusion of said primary cup into said bypass port by said generated pressure.

2. The master cylinder assembly of claim 1, said last named means comprising an insert formed of a porous pressure-restrictive material.

3. The master cylinder assembly of claim 1, said last named means comprising an insert forming a valve housing and having a passage therethrough provided with a valve chamber containing a check valve for closing said passage upon pressure buildup in said pressurizing chamber to cause a pressure buildup in said bypass port.

4. The master cylinder assembly of claim 3, further having a vent passage formed through said insert parallel to said first named insert passage for preventing trapping of pressurized fluid.

5. The master cylinder assembly of claim 3, further comprising a spring biased valve operator spring loaded by closing action of said valve and acting to positively open said valve upon a decrease of pressure acting on said valve to permit fluid bypassing action between said reservoir and said bore.

6. A port control assembly comprising, a housing having a first fluid reservoir chamber and a second fluid pressurizing chamber and a passage formed therein fluid connecting said chambers and terminating in a port at said second chamber, and insert means in said passage sensitive to fluid pressure generated at a predetermined rate in said second chamber to cause a pressure buildup in said passage at said port at a predetermined corresponding rate to establish a maximum pressure differential between said pressure chamber and said passage at said port.

7. The assembly of claim 6, said insert means having a check valve establishing a first rate of fluid flow from said second chamber to said first chamber and a second higher rate of fluid flow from said first chamber to said second chamber.

8. The assembly of claim 6, said insert means providing a fluid flow tortuous path acting as a pressure restriction at and above said predetermined rate of fluid pressure generation in said second chamber.

9. The assembly of claim 8, said fluid flow tortuous path being provided by constructing said insert means of a porous material having high pressure restrictive characteristics.

References Cited by the Examiner

UNITED STATES PATENTS 2,827,918  3/58  Fisher _____ 60—54.6 X
2,955,427  10/60  Porkert _____ 60—54.6

JULIUS E. WEST, *Primary Examiner.*

ROBERT R. BUNEVICH, *Examiner.*